(12) United States Patent
Kim et al.

(10) Patent No.: US 7,738,697 B2
(45) Date of Patent: Jun. 15, 2010

(54) COLOR TRANSFORMATION METHOD AND APPARATUS WITH MINIMIZED TRANSFORMATION ERRORS

(75) Inventors: Hyun-mun Kim, Gyeonggi-do (KR); Dae-sung Cho, Seoul (KR); Woo-shik Kim, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 1230 days.

(21) Appl. No.: 11/002,431

(22) Filed: Dec. 3, 2004

(65) Prior Publication Data
US 2005/0147295 A1 Jul. 7, 2005

Related U.S. Application Data

(60) Provisional application No. 60/527,017, filed on Dec. 5, 2003.

(30) Foreign Application Priority Data
Mar. 8, 2004 (KR) ............... 10-2004-0015605

(51) Int. Cl.
G06K 9/00 (2006.01)
(52) U.S. Cl. ................... 382/167; 358/518
(58) Field of Classification Search ............ 382/162, 382/167; 358/518
See application file for complete search history.

(56) References Cited

U.S. PATENT DOCUMENTS

| | | | |
|---|---|---|---|
| 5,745,119 A | 4/1998 | Parchem et al. | |
| 5,805,213 A * | 9/1998 | Spaulding et al. | 348/222.1 |
| 6,421,464 B1 | 7/2002 | Tran et al. | |
| 6,694,052 B1 * | 2/2004 | Matama | 382/169 |
| 6,754,383 B1 * | 6/2004 | Payton | 382/166 |
| 6,813,046 B1 * | 11/2004 | Gindele et al. | 358/505 |

FOREIGN PATENT DOCUMENTS

| | | |
|---|---|---|
| JP | 4-72960 | 3/1992 |
| JP | 6-105325 | 4/1994 |
| JP | 9-233320 | 9/1997 |

(Continued)

OTHER PUBLICATIONS

European Search Report issued by the European Patent Office on Feb. 1, 2007 in corresponding European Application No. 04 25 7501, EPO, Rijswijk, The Hague, The Netherlands.

(Continued)

*Primary Examiner*—Vikkram Bali
*Assistant Examiner*—Eueng-Nan Yeh

(57) ABSTRACT

A color transformation method of transforming a first color component set representing a first color space to a second color component set representing a second color space is provided. The method comprising: reading the first color component set; transforming the read first color component set to the second color component set using a predetermined transformation function; and storing the second color component set to correspond to the first color component set, wherein the transformation function is defined by: defining a first transformation matrix used for acquiring dominant components of the first color component set and multiplying each of the elements of the determined first transformation matrix by a predetermined integer k. The method further comprises inverse-transforming the second color component set to the first color component set.

25 Claims, 5 Drawing Sheets

FOREIGN PATENT DOCUMENTS

| JP | 11-69141 | 3/1999 |
| JP | 2002-281337 | 9/2002 |
| JP | 2003-323610 | 11/2003 |

OTHER PUBLICATIONS

Malvar, Henrique, et al., "*YCoCg-R: A Color Space with RGB Reversibility and Low Dynamic Range*" [Online], Joint Video Team (JVT) of ISO/IEC MPEG & ITU-TVCEG, JVT Pext Ad Hoc Group meeting: Jul. 22-24, 2003, Trondheim, pp. 1-8, Retrieved from the Internet: URL: http://ftp3.itu.ch/av-arch/jvt-site/2003_09_SanDiego/JVT-1014r3.doc>, (Saved Aug. 12, 2003).

Hao, Pengwei, et al., "*Comparative Study of Color Transforms for Image Coding and Derivation of Integer Reversible Color Transform*", Proceedings of 15th International Conference on Pattern Recognition, Sep. 3, 2003, pp. 224-227, vol. 3, IEEE, New York, NY, USA.

Pereira, Fernando, et al., "*The MPEG-4 Book*", 11.2 MPEG-2 Advanced Audio Coding, 2002, pp. 495-497, Prentice Hall PTR., Upper Saddle River, NJ, USA.

Topiwala, Pankaj, et al., "*New Invertible Integer Color Transforms Based on Lifting Steps and Coding of 4:4:4 Video*", [Online], Joint Video Team (JVT) of ISO/IEC MPEG & ITU-TVCEG, 9$^{th}$ Meeting: San Diego, CA, Sep. 2-5, 2003, pp. 1-16, Retrieved from the Internet: URL: http://ftp3.itu.ch/av-arch/jvt-site/2003_09_SanDiego/JVT-1015r7.doc>, (Saved Aug. 29, 2003).

Japanese Office Action for corresponding Japanese Patent Application No. 2004-352197 dated Oct. 20, 2010 (Submitted Jan. 20, 2010), Translation filed at this time.

\* cited by examiner

COLOR TRANSFORMATION METHOD AND APPARATUS WITH MINIMIZED TRANSFORMATION ERRORS

CROSS-REFERENCE TO RELATED APPLICATIONS

This application claims the benefit of Korean Patent Application No. 2004-15605, filed on March 8, 2004, in the Korean Intellectual Property Office, and of U.S. Provisional Patent Application No. 60/527,017, filed on Dec. 5, 2003, the disclosures of which are incorporated herein in entirety by reference.

BACKGROUND OF THE INVENTION

1. Field of the Invention

The present invention relates to the field of image processing, and more particularly, to a method and apparatus for color transformation with minimized transformation errors.

2. Description of the Related Art

As electronic technology advances, information provided to users includes not only simple text, but also various multimedia information such as snapshots, motion pictures, animation, and sounds. In particular, motion pictures are widely studied since next generation video on demand (VOD) services and interactive services are based on them.

Thanks to the development of digital electronics, conventional analog signals can be converted to digital data and techniques for processing various types of digital video media to manage vast amounts of data efficiently have been introduced. Some of the merits of digital image processing technology are as follows.

First, every analog device is subject to noise during processing operation such as signal transmission and restoration. Thus, the resolution of images is very likely to be degraded while performing restoration of recorded image signals. However, digital image processing devices are resistant to such noise.

Second, it is possible to process analog signals with computers by digitalizing them. Various processing methods such as compression are realized by processing image signals with computers.

Digital image processing techniques mainly concern how to process analog signals recorded on a medium by a computer. Digital image processing techniques are realized by using a Digital Video Interactive (DVI) method. The DVI method enables a processor adapted to perform instructions suitable for processing images to perform functions that cannot easily be executed by normal processors in a short period of time.

Furthermore, two expert groups, the Joint Photographic Experts Group (JPEG) and the Motion Picture Experts Group (MPEG), have promulgated a coding standard with DVI capability, and this coding standard is expected to play a significant role in digital image processing techniques since most companies are supporting it. In particular, the MPEG standard is not only used for processing images on personal computers, but it is also widely used for high definition systems such as High Definition Televisions (HDTVs). Subsequent updates to the MPEG standard such as MPEG II and MPEG III have been accomplished.

Since 1991, techniques for processing images by only using the processing capacity of main processors without requiring specialized hardware has been introduced, and QuickTime of Apple company and Video for Windows of Microsoft and Indeo of Intel are commonly used. These image processing techniques are especially suitable to personal computers thanks to advancing high speed main processors.

With various digital image processing techniques introduced, attempts to standardize various techniques have been made. Standardized digital image processing techniques are not only used for video conference systems, digital broadcasting codec systems, and video telephone systems, but they are also shared and supported in computer industries and communication industries. For example, digital compression techniques for storing information on optical disks such as CD-ROMs or digital recording media is realized by a technique which is very similar to a compression technique for video conferencing. Nowadays, MPEG standardization is being made by ISO-IEC, JTC1, SC1, and WGI 1.

For efficient use of digital image processing techniques, a preprocessing operation which transforms color signals in RGB color space to other color spaces is required. That is, color space transformation, filtering, and color subsampling are performed in the preprocessing operation.

Color space transformation means transforming color images made of R, G, B components into components representing luminance Y and chrominance of the image. Information of R, G, and B color signals overlaps, but most information including delicate regions of an image is mapped into luminance information Y while redundant color information is left in the chrominance information by using the color space transformation. This is because human eyes are more sensitive to luminance variations than to the chrominance variations.

FIG. 1 depicts a color transformation technique according to the conventional art.

In FIG. 1, the RGB color space is transformed into a YCbCr color space by using equation 1.

$$\begin{bmatrix} Y \\ Cb \\ Cr \end{bmatrix} = \Phi_{YCbCr} \begin{bmatrix} R \\ G \\ B \end{bmatrix}, \quad (1)$$

$$\begin{bmatrix} Y \\ Cb \\ Cr \end{bmatrix} = \begin{bmatrix} 0.2126 & 0.7152 & 0.0722 \\ -0.1146 & -0.3854 & 0.5 \\ 0.5 & -0.4542 & -0.0458 \end{bmatrix} \begin{bmatrix} R \\ G \\ B \end{bmatrix}$$

The inverse transformation is performed by equation 2.

$$\begin{bmatrix} R \\ G \\ B \end{bmatrix} = \Phi_{YCbCr}^{-1} \begin{bmatrix} Y \\ Cb \\ Cr \end{bmatrix}, \quad (2)$$

$$\begin{bmatrix} R \\ G \\ B \end{bmatrix} = \begin{bmatrix} 1.0 & 0.0 & 1.5748 \\ 1.0 & -0.1873 & -0.4681 \\ 1.0 & 1.8556 & 0.0 \end{bmatrix} \begin{bmatrix} Y \\ Cb \\ Cr \end{bmatrix}$$

The color transformation techniques of the prior art are only restricted to maintaining compatibility with black and white signal processing. However, it has been changed in order to transmit high quality, and high resolution image information at high speed. The H.264/AVC standard includes techniques that are mainly aimed at reducing color transformation errors.

A color transformation method invented by Parchem, et al. and filed by Microsoft in U.S. patent application Ser. No. 5,745,119 is depicted in FIG. 2.

FIG. 2 shows a transformation operation converting color signals in the RGB color space into a YCoCg color space.

As shown in FIG. 2, the RGB color space is transformed into a YCoCg color space using a transformation function ($\Phi_{YCoCg}$). The YCoCg signals are digitally-processed, and the processed signals are inverse-transformed into the RGB color space using an inverse transformation function ($\Phi_{YCoCg}^{-1}$).

As shown in FIG. 2, the transformation to the YCoCg color space is performed using equation 3.

$$\begin{bmatrix} Y \\ Co \\ Cg \end{bmatrix} = \Phi_{YCoCg} \begin{bmatrix} R \\ G \\ B \end{bmatrix}, \quad (3)$$

$$\begin{bmatrix} Y \\ Co \\ Cg \end{bmatrix} = \begin{bmatrix} 1/4 & 1/2 & 1/4 \\ 1 & 0 & -1 \\ -1/2 & 1 & -1/2 \end{bmatrix} \begin{bmatrix} R \\ G \\ B \end{bmatrix}$$

The inverse transformation to the RGB color space is performed by using equation 4.

$$\begin{bmatrix} R \\ G \\ B \end{bmatrix} = \Phi_{YCoCg}^{-1} \begin{bmatrix} Y \\ Co \\ Cg \end{bmatrix}, \quad (4)$$

$$\begin{bmatrix} R \\ G \\ B \end{bmatrix} = \begin{bmatrix} 1 & 1/2 & -1/2 \\ 1 & 0 & 1/2 \\ 1 & -1/2 & -1/2 \end{bmatrix} \begin{bmatrix} Y \\ Co \\ Cg \end{bmatrix}$$

Similarly to FIG. 2, U.S. patent application Ser. No. 6,421,464 invented by Tran et, al. and filed by FastVDO introduces a transformation method for transforming an RGB color space to a YFbFr color space. The color transformation techniques introduced by both Microsoft and FastVDO guarantee reversibility using an integer mapping and lifting scheme.

However, these color transformation techniques are based on ideal processing operation, and coding errors are inevitable in real operation. Coding errors occur during inverse transformations as well as during forward transformations.

Thus, color transformation techniques with reduced coding errors are highly required.

SUMMARY OF THE INVENTION

The present invention provides a color transformation method that reduces coding errors.

The present invention also provides a color transformation apparatus that reduces coding errors.

According to an aspect of the present invention, there is provided a color transformation method of transforming a color component set representing a color space to another color component set representing a different color space. The method comprises reading a first color component set from a predetermined memory, transforming the read first color component set to a second color component set using a predetermined transformation function, and storing the second color component set to correspond to the first color component set. The transformation function is defined by determining a first transformation matrix used for acquiring dominant components of the first color component set and multiplying each of the elements of the determined first transformation matrix by a predetermined integer k.

The method further comprises inverse-transforming the second color component set to the first color component set. The inverse-transforming includes reading the second color component set from the predetermined memory, inverse-transforming the read second color component set to the first color component set by using an inverse transformation function, and storing the transformed second color component set to correspond to the first color component set. The inverse transformation function is defined by determining an inverse matrix of the first transformation matrix and multiplying each of the elements of the inverse matrix by a reciprocal of the integer k.

According to another aspect of the present invention, a color transformation method transforms a color component set representing a color space to another color component set representing a different color space. The method includes reading a first color component set from a predetermined memory, transforming the read first color component set to a second color component set using a predetermined transformation function, and storing the second color component set to correspond to the first color component set. The transformation function is defined by determining a first transformation matrix used for acquiring dominant components of the first color component set and compensating the first transformation matrix to substantially equalize a dynamic range of the first color component set with a dynamic range of the second color component set.

The method further comprises inverse-transforming the second color component set to the first color component set, by reading the second color component set from the predetermined memory, inverse-transforming the read second color component set to the first color component set using an inverse transformation function, and storing the transformed second color component set to correspond to the first color component set. The inverse transformation function is realized by determining an inverse matrix of the first transformation matrix. Furthermore, the first transformation matrix is determined based on a Karhunen-Loeve (KL) Transformation used for acquiring dominant components using an auto-correlation characteristic of the first color components.

According to an aspect of the present invention, there is provided a color transformation apparatus for transforming a first color component set representing a first color space to a second color component set representing a second color space. The apparatus comprises a memory storing the first color component set and the second color component set to correspond to each other and a color transformer for transforming the first color component set read from the memory to the second color component set. The color transformer comprises a dominant component acquirer for determining a first transformation matrix used for acquiring dominant components of the first color component set according to a predetermined transformation algorithm, a first multiplier for calculating a second transformation matrix that corresponds to the determined first transformation matrix multiplied by a predetermined integer k; and a central processor for calculating a second color component set using the second transformation matrix.

An apparatus according to the present invention further comprises an inverse-transformer for inverse-transforming the second color component set to the first color component set by using an inverse transformation function. The inverse-transformer comprises an inverse matrix calculator for calculating an inverse matrix of the first transformation matrix and a second multiplier for calculating an inverse transformation matrix by multiplying each of the elements of the inverse matrix by a reciprocal of the integer k.

Coding errors can be reduced by using color transformation method and apparatus according to the present invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
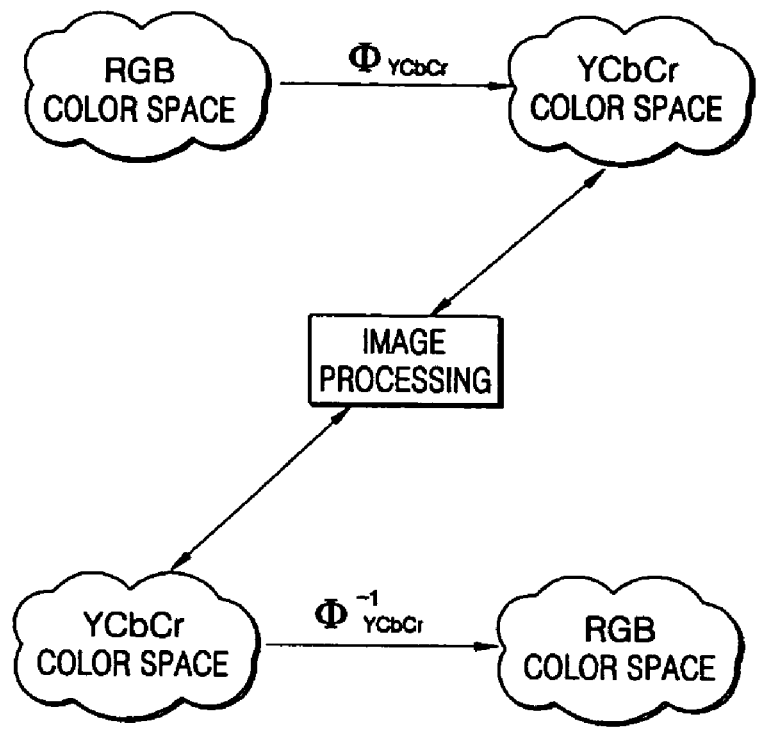
FIG. 1 depicts a color transformation technique according to the conventional art.
Figure 2:
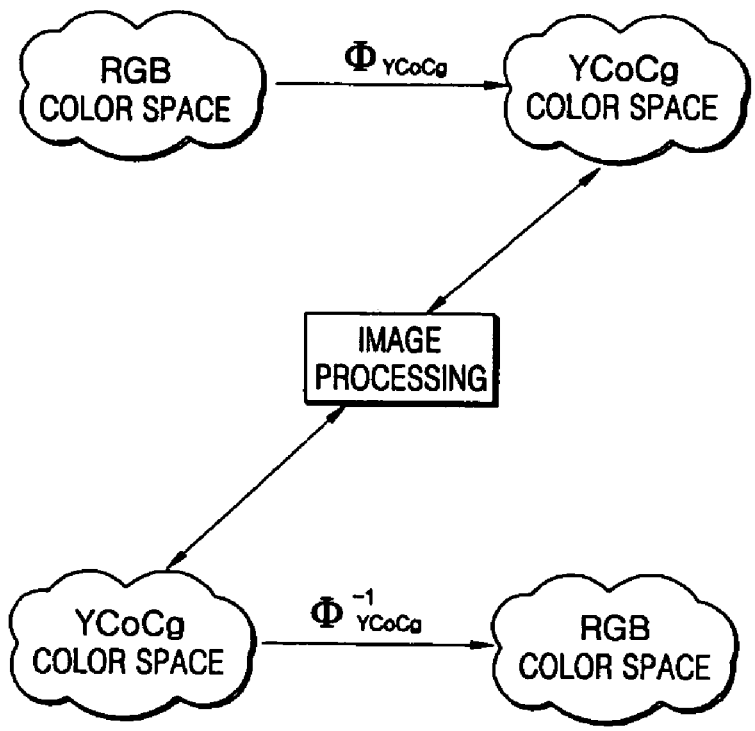
FIG. 2 shows a transformation operation converting color signals in the RGB color space into a YCoCg color space.
Figure 3:
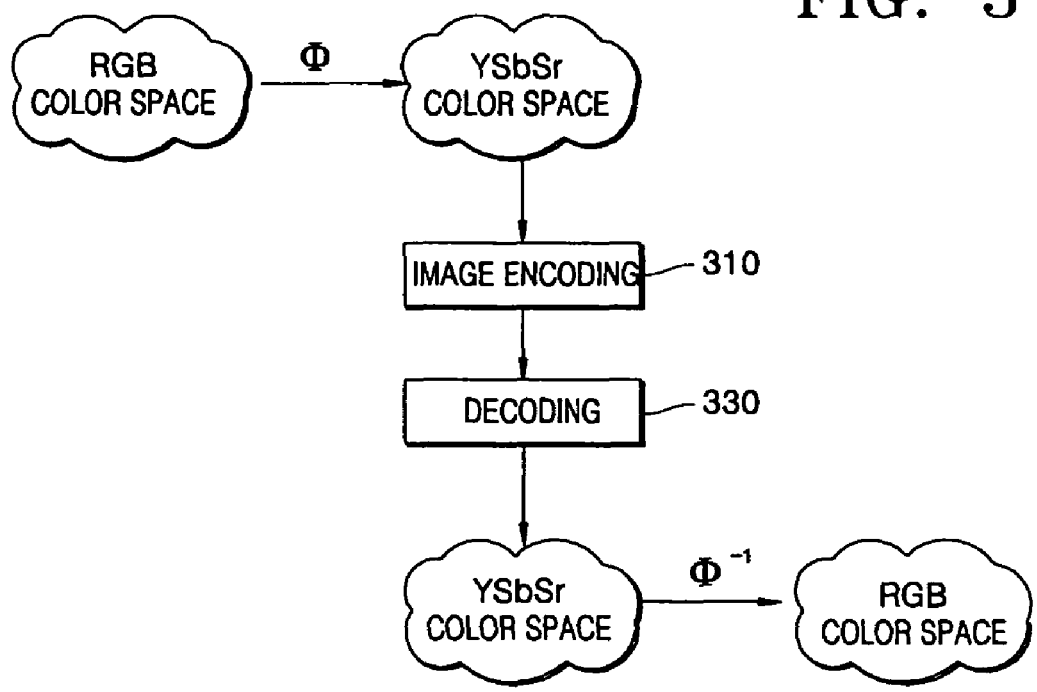
FIG. 3 is a block diagram depicting an exemplary color transformation method and apparatus according to present invention.

FIG. 3 is a block diagram depicting a color transformation method and apparatus according to present invention.

Referring to FIG. 3, color information represented in a RGB color space is transformed to color information represented in a YSbSr color space using a transformation function $\Phi$. The color information represented in a YSbSr color space is compressed by an image encoding 310 and decompressed by a decoding 330 operation. The compressed image information is transmitted to a receiving part using hardware of low specification, and the received color information is transformed back to the RGB color space using an inverse transformation function $\Phi^{-1}$.

Image processing efficiency is improved by transforming the RGB color space to the YSbSr color space before the image encoding 310 and decoding 330 operations. That is, the digital image signal compression method uses a high correlation characteristic among image data. Motion picture signals consist of similar values with small variation, and image data consist of pixels with similar luminance and chrominance values as a whole. By reducing redundancy in image signals, information sufficient to form an original image can be transmitted with a reduced amount of data. For example, in the case of a blue sky image, the original image can be formed by using one single value, representing blue, rather than using hundreds or thousands of pixels having the same information. This operation reducing redundancy is called image compression or image encoding.

Various image compression techniques have been developed to be used with one another. Several criterions to classify these image compression techniques are possible, however, the techniques can be classified into lossless and lossy techniques. With the lossless technique, it is possible to restore original data completely, so this method is used for medical applications such as X-rays and computerized tomography (CT) where small pixel value variations are important. The compression ratio is rather low, for example, about 3:1~2:1. On the other hand, the lossy technique has a high compression ratio, for example, about 10:1~40:1, with relatively high resolution, and the ratio can even be improved with a small resolution degradation. Therefore, the lossy compression technique is widely used. The lossy method is mainly used for applications including multimedia services where a small pixel value variation is not very important and only the quality of the image as a whole is of interest. Bit stream data processed by various image compression techniques is inverse transformed using a decoding method.

By the way, the image signal transformed into the YSbSr color space has errors such as round-off errors during the encoding operation 310, and the errors propagate during the decoding operation 330. Coding errors of the color transformation methods introduced by Microsoft and FastVDO are as follows.

For brevity of explanation, suppose that RGB color information has a dynamic range from 0 to 255. In addition, suppose that other color spaces also have 8-bit precision. It is to be noted that the forgoing assumptions and do not limit the scope of the present invention. The range and precision are exemplary and for purposes of explaining the invention. Those skilled in the art will appreciate that that the present invention is applicable to color information of larger or smaller ranges and precision.

First, the color information in the RGB color space is considered to be transformed to the YCbCr color space. The roundoff error of equation 1 corresponds to $1/12$. Generally, the roundoff error $\Delta E$ of the function of equation 5 is calculated as equation 6.

$$f(x) = \begin{cases} a, & -\alpha/1 < x < \alpha/2 \\ 0, & \text{otherwise} \end{cases} \quad (5)$$

$$\Delta E = \int_{-\frac{\alpha}{2}}^{\frac{\alpha}{2}} x^2 f(x) dx \quad (6)$$

$$= \frac{1}{12} a^2$$

Now, during the inverse transformation from the YCbCr color space to the RGB color space, we can obtain equation 7 by using equation 2 and equation 6.

Inverse transformation error=$1/12 * (1^2 + 0.1873^2 + 0.4681^2)$ (7)

Therefore, errors of each color component ER, EG, EB are as shown in equation 8.

$$E_R = \frac{1}{12}(1^2 + 1^2 + 0^2 + 1.5748^2) = 0.3733 \quad (8)$$

$$E_G = \frac{1}{12}(1^2 + 1^2 + 0.1873^2 + 0.4681^2) = 0.1878$$

$$E_B = \frac{1}{12}(1^2 + 1^2 + 1.8556^2 + 0^2) = 0.4536$$

The first terms of each of the error components in equation 8 represent encoding errors, while the following three components represent propagation errors.

Since we suppose that each color component is represented with 8-bit precision, a peak signal to noise ratio (PSNR) is calculated using equation 9.

$$PSNR_R = 10 \cdot \log \frac{255^2}{E_R} = 52.4 \text{ db} \quad (9)$$

$$PSNR_G = 10 \cdot \log \frac{255^2}{E_G} = 55.4 \text{ db}$$

$$PSNR_B = 10 \cdot \log \frac{255^2}{E_B} = 51.6 \text{ db}$$

As shown in equation 9, the PSNR of each color component is affected by ER, EG and EB of each color component. The overall error in each color component is affected by the propagation error more than the encoding error. This is because the propagation error is three times bigger than the encoding error. Therefore, the signal to noise ratio can be improved by reducing the propagation error.

By using this characteristic, the color transformation method according to one aspect of the present invention suggests a new color transformation function which multiplies each element of the transformation function $\Phi$ by a predetermined integer k. By multiplying each element of the color transformation function by the integer k, encoding errors increase. However, propagation errors are significantly reduced since each component of the inverse transformation function $\Phi^{-1}$ is multiplied by a reciprocal of the integer 1/k. Therefore, the overall error, i.e., the summed result of the encoding and propagation error, is reduced, which also reduces the PSNR.

The operation of multiplying the transformation function $\Phi$ by k and the inverse transformation function $\Phi^{-1}$ by 1/k requires an additional bit in representing color information. However, it is possible to use an N+1 codec for N bit data as in the YCoCg color transformation method introduced by Microsoft using a lifting scheme having an extra bit. Furthermore, according to a JVT experts specification, it is not necessary to use codecs having the same number of bits as the input data. Hence, the additional bit can be processed by the hardware of the prior art.

The color transformation technique as suggested above can also be applied to all color transformation methods according to the prior art. For instance, each component of every transformation function that converts one color space, such as RGB color space, to another color space, such as a YUV, YIQ, YPbPr, YUW, XYZ, or YCbCr color space, can be multiplied by a predetermined integer k, and each component of the inverse transformation function can be multiplied by the reciprocal 1/k, and the PSNR can be improved.

Propagation errors can be well reduced when a bigger integer is used, however, an integer k that satisfies $k=2^m$ can facilitate hardware implementations. For example, when k satisfies $k=2^m$, color information can be shifted by m bits when multiplied.

Figure 4:
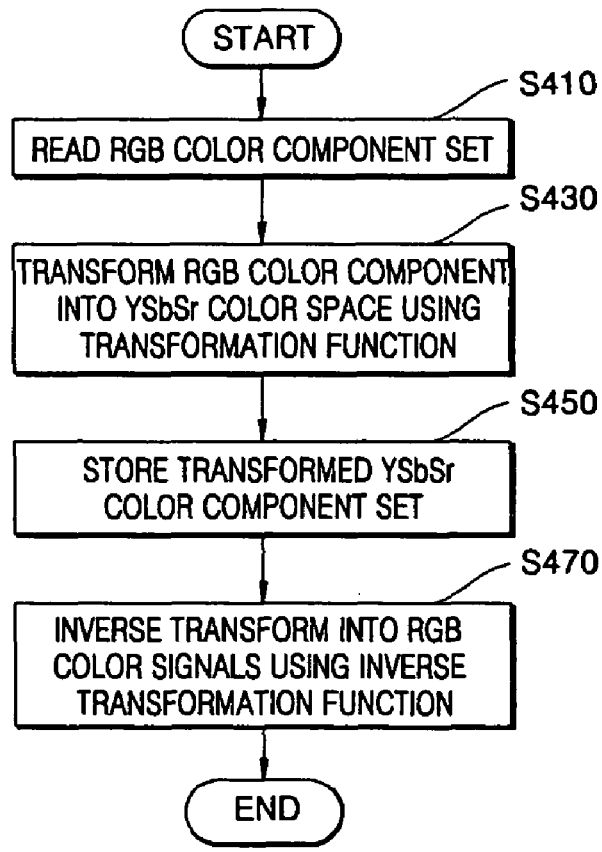
FIG. 4 conceptually shows an exemplary color transformation method according to the present invention.

FIG. 4 conceptually shows an exemplary color transformation method according to the present invention.

First, an RGB color component set represented in an RGB color space is read in S410. Then, the RGB color component is transformed to a YSbSr color space by using a transformation function $\Phi$. As noted above, the propagation error can be minimized and the PSNR can be improved by multiplying each element of the transformation function $\Phi$ by a predetermined integer k.

Then, the YSbSr color component set transformed by the transformation function $\Phi$ is stored and processed in S450. For example, the processed YSbSr color component set can be compressed and transmitted. Then, the received YSbSr color component set can be inverse transformed to the RGB color space by using an inverse transformation function $\Phi^{-1}$ in S470. An exemplary operation to derive the transformation function $\Phi$ according to the present invention is now described in detail.

Figure 5:
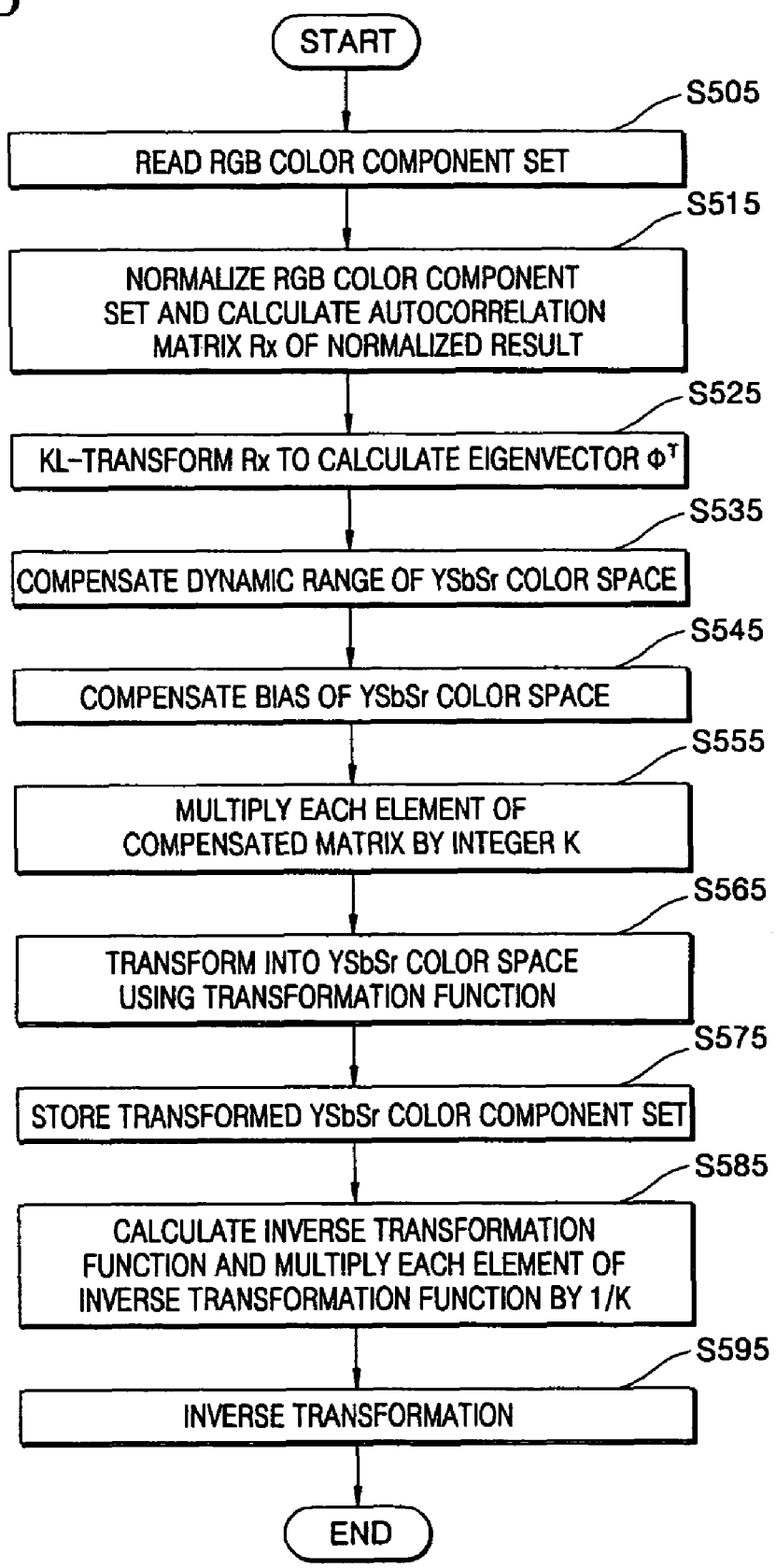
FIG. 5 shows an exemplary color transformation method according to the present invention in detail.

As shown in FIG. 5, a color transformation method according to the present invention includes reading a color component set in a RGB color space from a memory in S505. The RGB color component set can be, for example, an experimental value derived from a vast amount of specimens.

Then, the RGB color component set is normalized and an autocorrelation matrix Rx of the normalized result is calculated in S515. The normalization operation can be performed according to equation 10.

$$R = \frac{r - E[r]}{std(r)}, \quad G = \frac{r - E[g]}{std(g)}, \quad B = \frac{r - E[b]}{std(b)} \quad (10)$$

In equation 10, R, G, and B represent normalized results of each color component (i.e., red, green, and blue), E[.] represents a mean value, and std(.) means a standard variation and r represents a red color component.

The autocorrelation matrix Rx of R, G, and B is calculated using equation 11:

$$Rx = \begin{bmatrix} \text{var}(R) & E[RG] & E[RB] \\ E[RG] & \text{var}(G) & E[GB] \\ E[RB] & E[GB] & \text{var}(B) \end{bmatrix}. \quad (11)$$

An example of experimental values that are widely used is provided in equation 12:

$$Rx = \begin{bmatrix} 1 & 0.8525 & 0.7545 \\ 0.8525 & 1 & 0.9225 \\ 0.7545 & 0.9225 & 1 \end{bmatrix} \quad (12)$$

The example of the present invention shown in FIG. 5 performs color transformation by using Karhunen-Loeve Transformation (KL transformation). However, it is to be understood that that KL transformation is but one exemplary color transformation that can be used in practicing the invention. Those skilled in the art will appreciate all techniques of the prior art can be used for color transformation.

To perform KL transformation, an eigenvector and an eigenvalue are calculated using equation 13 in S525.

$$Rx \cdot \Phi = \Phi \cdot \Delta \quad (13)$$

In equation 13, $\Phi$ is a set of eigenvectors satisfying equation 14, and $\Delta$ is a diagonal matrix having a set of eigenvalues arranged in descending order as its elements.

$$\Phi = [\Phi_1 \ \Phi_2 \ \Phi_3] \quad (14)$$

The eigenvector and the eigenvalue are as in equations 15 and 16.

$$\Phi^T = \begin{bmatrix} 0.5587 & 0.5968 & 0.5758 \\ -0.7860 & 0.1597 & 0.5972 \\ -0.2644 & 0.7863 & -0.5584 \end{bmatrix} \quad (15)$$

-continued $$\Delta = \begin{bmatrix} 2.6882 & 0 & 0 \\ 0 & 0.2536 & 0 \\ 0 & 0 & 0.0582 \end{bmatrix} \quad (16)$$

Then, KL transformation is performed to reduce redundancy of image signals using equations 15 and 16.

As shown in equation 15, the eigenvector $\Phi^T$ is a unitary matrix. That is, the eigenvector $\Phi^T$ is normalized by a norm of L2. Thus, each row of the eigenvector $\Phi^T$ is scaled using a L1 norm to make a dynamic range of the transformed color component set to that of the RGB color space in step S535. Since the vectors are only scaled, the characteristic of KL transformation is maintained. The L2 norm represents a sum of each element of the vector, while the L1 norm represents a sum of the absolute value of the elements.

The eigenvector $\Phi^T$ scaled by the L1 norm is shown in equation 17 below.

$$\Phi_{L1}^T = \begin{bmatrix} 0.3227 & 0.3447 & 0.3326 \\ -0.5095 & 0.1035 & 0.3870 \\ -0.1643 & 0.4887 & -0.3470 \end{bmatrix} \quad (17)$$

By using equation 17, the dynamic range of the YSbSr color space is made to correspond to that of the RGB color space. However, its bias must be compensated. The bias is compensated to make the dynamic range of color components lie between 0 and 255 in step S545. A bias of 128 is acquired by equalizing a sum of positive coefficients with a sum of negative coefficients in FIG. 4. The bias compensated result is shown in equation 18 below.

$$\Phi_{L1,biased}^T = \begin{bmatrix} 0.323 & 0.344 & 0.333 \\ -0.5 & 0.106 & 0.394 \\ -0.161 & 0.5 & -0.339 \end{bmatrix} \quad (18)$$

Equation 18 is similar to a transformation function of the KL transformation, and maintains both of the dynamic range and the bias of the YCbCr color space. As noted above, each element in equation 18 can be multiplied by an integer k to minimize the encoding error in step S555.

When k=2, the result is given as equation 19 in step S565. Equation 19 represents a color transformed from the RGB color space into the YSbSr color space.

$$\begin{bmatrix} Y \\ Sb \\ Sr \end{bmatrix} = \begin{bmatrix} 0.646 & 0.688 & 0.666 \\ -1.0 & 0.212 & 0.788 \\ -0.322 & 1.0 & -0.678 \end{bmatrix} \begin{bmatrix} R \\ G \\ B \end{bmatrix} \quad (19)$$

The color component set represented in YSbSr color space transformed by equation 19 is stored in a memory and processed in step S575. As mentioned above, the color component set represented in YSbSr color space can be compressed by a predetermined compression algorithm and transmitted. The received color component set in YSbSr color space is inverse transformed by an inverse transformation function. In doing this, the inverse transformation function corresponds to an inverse matrix of the transformation matrix shown in equation 19 multiplied by the integer k. Additionally, the inverse transformation function is the same as an inverse matrix of a matrix in equation 18 multiplied by 1/k in step S585. The color component set represented in YSbSr color space is inverse transformed to the RGB color space by using the derived inverse matrix in step S595.

In FIG. 5, the KL transformation transforms the image information by using a series expansion of a continuous random process. When a random vector is given, the eigenvectors of the autocorrelation matrix Rx of the given vector are used as a basis vector of the KL transformation. According to linear algebra, coefficients of KL transformation are equivalent to the eigenvectors of the autocorrelation matrix Rx. Since most energy of input random signals is concentrated in the first few coefficients, KL transformation is also called a principal component analysis scheme.

However, as discussed above, the present invention is not limited to KL transformation. On the other hand, the present invention can be applied to every transformation technique that concentrates energy by acquiring a new vector that consists of transformed values having a correlation characteristic much lower than original signals by transforming input vectors. For example, a Discrete Fourier Transformation (DFT), a Discrete Cosine Transformation (DCT), a Wavelet Transformation, a Walsh Transformation, and a Hadamard Transformation can also be adopted for the present invention.

The DFT uses Fourier Transformation of infinite data series on N finite data blocks, and corresponds to a sample spectrum acquired from a frequency spectrum. In the DFT, a stair effect increases as the encoding bit rate decreases, resulting in degradation of image quality. In addition, DFT is hard to perform since transformation coefficients are complex numbers. The DCT has a reasonable energy concentration characteristic when autocorrelation of input data is big. The Hadamard Transformation is well suited for digital signal processing, includes real elements, and has duality and orthogonal characteristics. High speed transformation is possible by using the Hadamard Transformation since there is no multiplication operation during the process.

Figure 6:
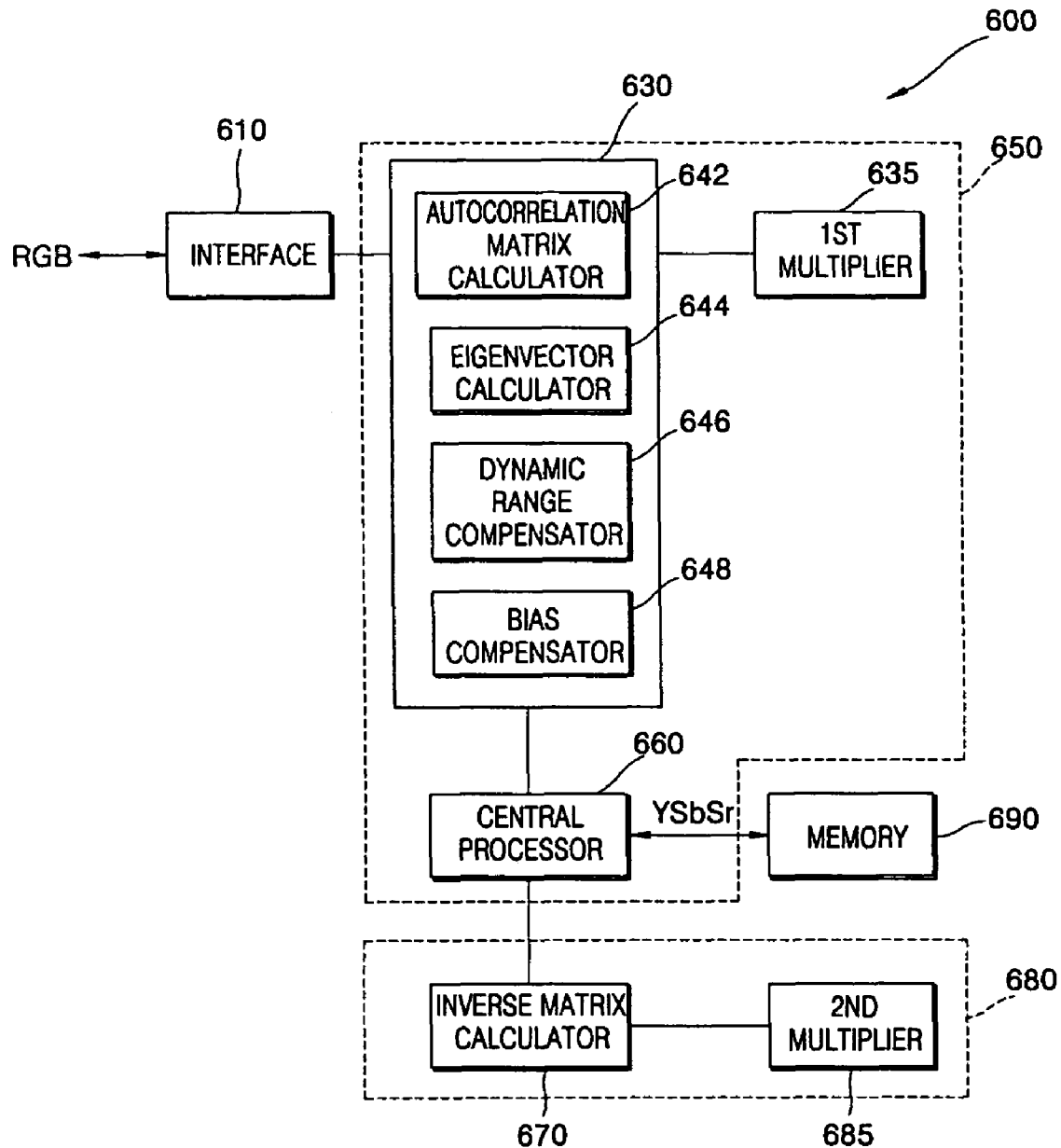
FIG. 6 conceptually shows an exemplary color transformation apparatus according to the present invention.

FIG. 6 conceptually shows an exemplary color transformation apparatus according to the present invention.

The color transformation apparatus 600 in FIG. 6 includes an interface 610, a color transformer 650, a memory 690, and an inverse transformer 680.

First, a color component set in RGB color space is received by the color transformation apparatus 600 by way of the interface 610. The received color component set is transformed by using a transformation function in the color transformer 650. The color transformer 650 includes a dominant component acquirer 630, a first multiplier 635, and a central processor 660. A first transformation matrix to define dominant components of the received color component set is calculated in the dominant component acquirer 630. The first multiplier 635 calculates a second transformation matrix by multiplying the first transformation matrix acquired in the dominant component acquirer 630 by an integer k. The central processor 660 transforms the color component set using the second transformation matrix.

For brevity of explanation, the dominant component acquirer 630 in the embodiment shown in FIG. 6 acquires dominant components of image information using KL transformation. The dominant component acquirer 630 includes an autocorrelation matrix calculator 642, an eigenvector calculator 644, a dynamic range compensator 646, and a bias compensator 648. The autocorrelation matrix calculator 642 acquires the autocorrelation matrix Rx of the input signal. As noted above, the eigenvector calculator 644 determines the first transformation matrix using eigenvectors. The dynamic range compensator 646 and the bias compensator 648 compensate the dynamic range and a bias component of the transformed color component set to correspond to the dynamic range and the bias component of the RGB color space, respectively.

The color component set transformed by the color transformer 650 is stored in the memory 690 to correspond to the color component set in the RGB color space.

The color transformation apparatus 600 shown in FIG. 6 also includes an inverse transformer 680. The inverse transformer 680 inverse transforms the processed color component set in the YSbSr color space to the color component set in the RGB color space. The inverse transformer 680 includes an inverse matrix calculator 670 and a second multiplier 685. As mentioned above, the inverse matrix used to perform inverse transformation corresponds to an inverse matrix of the second transformation matrix calculated in the dominant component acquirer 630. Therefore, the second multiplier 685 multiplies each element of the result of the inverse matrix calculator 670, i.e., the inverse matrix of the first transformation matrix, by 1/k. By multiplying the inverse matrix by 1/k, the propagation error is reduced.

Figure 7:
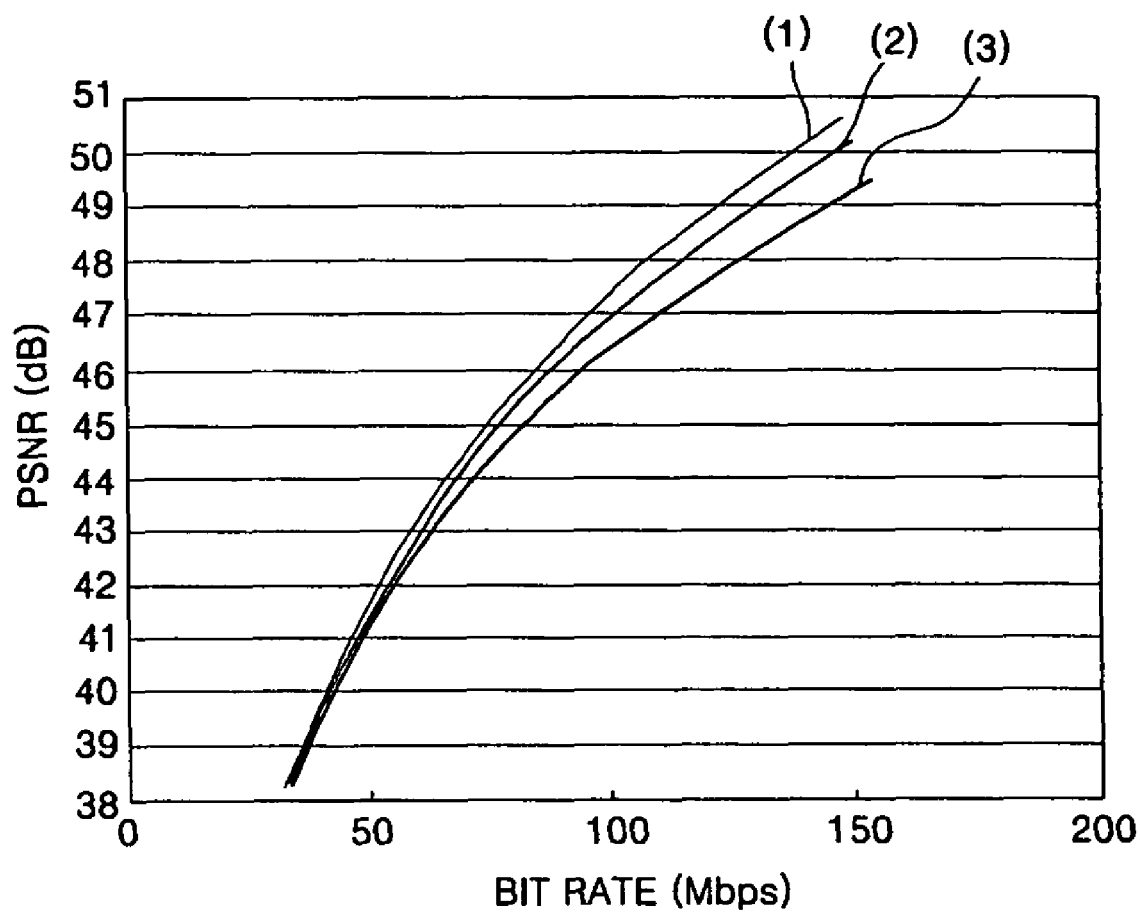
FIG. 7 is a graph comparing a maximum signal to noise ratio of the color transformation method and apparatus according to the present invention with that of other methods.

FIG. 7 is a graph comparing a maximum signal to noise ratio of the color transformation method and apparatus according to the present invention with that of other methods.

FIG. 7 depicts coding errors of each of a YUV color space, a YCbCr color space, and a YSbSr color space according to the present invention. Line (1) represents the coding error of the YSbSr color space according to the present invention, while lines (2) and (3) represent the coding errors of the YCbCr color space introduced by Microsoft and a YUV color space, respectively.

As shown in FIG. 7., the color transformation method according to the present invention has a PSNR that is more than 2.0% bigger than that of the YCbCr and a PSNR that is more than 4.0% bigger than that of the YUV. As bit rates increase, the improvement becomes more conspicuous, which means the present invention performs better as hardware becomes more advanced.

According to the present invention, a color transformation method for reducing coding errors of processed color signals is provided.

In addition, a color transformation apparatus for reducing coding errors of processed color signals is also provided.

The embodiments of the present invention can be written as computer programs and can be implemented in general-use digital computers that execute the programs using a computer readable recording medium.

Examples of the computer readable recording media include magnetic storage media (e.g., ROM, floppy disks, hard disks, etc.), optical recording media (e.g., CD-ROMs, or DVDs), and storage media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the invention is not limited to the transformation functions provided in equations 16 and 17, and particular element values are to be changed as test images are changed. Therefore, the present invention can be applied to every transformation technique that derives a transformation function by acquiring dominant components of image information and compensates a dynamic range and a bias component of output to correspond to those of the input. Furthermore, the color transformation apparatus according to the present invention is shown to include an inverse transformer, however, the present invention is not limited to this configuration.

What is claimed is:

1. A color transformation method of transforming a color component set representing color space to another color component set representing different color space, the method comprising:
   a) reading a first color component set from a predetermined memory;
   b) transforming the read first color component set to a second color component set using a predetermined transformation function; and
   c) storing in tangible memory the second color component set to correspond to the first color component set, wherein the predetermined transformation function is defined by:
   determining a first transformation matrix for acquiring dominant components of the first color component set; and
   multiplying each element of the determined first transformation matrix by a predetermined integer k,
   thereby transforming a color component set representing color space to another color component set representing color space.

2. The method of claim 1, wherein the method further comprises:
   d) inverse-transforming the second color component set to the first color component set, the inverse-transforming comprising:
      d1) reading the second color component set from the predetermined memory;
      d2) inverse-transforming the read second color component set to the first color component set by using an inverse transforming function; and
      d3) storing the transformed second color component set to correspond to the first color component set, wherein the inverse transformation function is defined by:
   determining an inverse matrix of the first transformation matrix, and
   multiplying each of the elements of the inverse matrix by a reciprocal of the integer k.

3. The method of claim 2, wherein the integer k satisfies $k=2^m$, wherein m is a positive integer.

4. The method of claim 3, wherein the first transformation matrix is determined based on one of a Discrete Fourier Transformation (DFT), a Discrete Cosine Transformation (DCT), a Walsh Transformation, and a Hadamard Transformation.

5. The method of claim 3, wherein the first transformation matrix is determined based on a Karhunen-Loeve (KL) Transformation used for acquiring dominant components using an autocorrelation characteristic of the first color components.

6. The method of claim 5, wherein the first transformation matrix is determined by:
   e1) calculating an autocorrelation matrix of normalized values of elements of the first color component set;
   e2) calculating an eigenvector by KL-transforming the autocorrelation matrix;
   e3) compensating the eigenvector to substantially equalize a dynamic range of the first color component set with a dynamic range of the second color component set; and
   e4) compensating a bias of the first color component set with a bias of the second color component set.

7. The method of claim 6, wherein the first color space is a color space represented by a RGB color component set, the compensating operation e3) further comprises normalizing each of the elements of the eigenvector using an L1 norm, and the transformation function is substantially equal to the following matrix:

$$\begin{bmatrix} 0.646 & 0.688 & 0.666 \\ -1.0 & 0.212 & 0.788 \\ -0.322 & 1.0 & -0.678 \end{bmatrix}.$$

8. The method of claim 1, wherein the multiplying comprises multiplying each element by a same predetermined integer.

9. A color transformation method transforming a color component set representing a color space to another color component set representing a different color space, the method comprising:
   a) reading a first color component set from a predetermined memory;
   b) transforming the read first color component set to a second color component set using a predetermined transformation function; and
   c) storing the second color component set to correspond to the first color component set, wherein the transformation function is defined by:
   c1) determining a first transformation matrix used for acquiring dominant components of the first color component set, and
   c2) compensating the first transformation matrix to substantially equalize a dynamic range of the first color component set with a dynamic range of the second color component set, thereby transforming a color component set representing a color space to another color component set representing a different color space.

10. The method of claim 9, further comprising:
   d) inverse-transforming the second color component set to the first color component set, said inverse-transforming comprising:
   d1) reading the second color component set from the predetermined memory;
   d2) inverse-transforming the read second color component set to the first color component set using an inverse transformation function; and
   d3) storing the transformed second color component set to correspond to the first color component set, wherein the inverse transformation function is determined by defining an inverse matrix of the first transformation matrix.

11. The method of claim 10, wherein the first transformation matrix is determined based on a Karhunen-Loeve (KL) Transformation used for acquiring dominant components using an autocorrelation characteristic of the first color components.

12. The method of claim 11, wherein the first transformation matrix is determined by:
   e1) calculating an autocorrelation matrix of normalized values of elements of the first color component set and
   e2) calculating an eigenvector by KL-transforming the autocorrelation matrix, wherein the transformation matrix is compensated to substantially equalize a bias of the first color component set with a bias of the second color component set.

13. The method of claim 12, wherein the first color space is a color space represented by a RGB color component set, the compensating operation c2) further comprises normalizing each of the elements of the eigenvector using a L1 norm, and the transformation function is substantially equal to the following matrix:

$$\begin{bmatrix} 0.646 & 0.688 & 0.666 \\ -1.0 & 0.212 & 0.788 \\ -0.322 & 1.0 & -0.678 \end{bmatrix}.$$

14. A color transformation apparatus transforming a color component set representing a color space to another color component set representing a different color space, comprising:
   tangible memory for storing a first color component set and a second color component set to correspond to each other; and
   a color transformer for transforming the first color component set read from the tangible memory to the second color component set, wherein the color transformer comprises:
      a dominant component acquirer for determining a first transformation matrix used for acquiring dominant components of the first color component set according to a predetermined transformation algorithm;
      a first multiplier for calculating a second transformation matrix which corresponds to the determined first transformation matrix multiplied by a predetermined integer k; and
      a central processor for calculating a second color component set using the second transformation matrix.

15. The apparatus of claim 14, further comprising an inverse transformer for inverse-transforming the second color component set to the first color component set by using an inverse transformation function, wherein the inverse-transformer comprises:
   an inverse matrix calculator for calculating an inverse matrix of the first transformation matrix and
   a second multiplier for calculating an inverse transformation matrix by multiplying each of the elements of the inverse matrix by a reciprocal of the integer k.

16. The apparatus of claim 15, wherein the integer k, satisfies $k=2^m$, where m is a positive integer.

17. The apparatus of claim 16, wherein the dominant component acquirer determines the first transformation matrix based on one of a Discrete Fourier Transformation (DFT), a Discrete Cosine Transformation (DCT), a Walsh Transformation, and a Hadamard Transformation.

18. The apparatus of claim 16, wherein dominant component acquirer determines the first transformation matrix based on a Karhunen-Loeve (KL) Transformation used for acquiring dominant components using an autocorrelation characteristic of the first color components.

19. The apparatus of claim 18, wherein the dominant component acquirer comprises:
   an autocorrelation matrix calculator for calculating an autocorrelation matrix of normalized values of elements of the first color component set;
   an eigenvector calculator for calculating an eigenvector by KL-transforming the autocorrelation matrix;
   a dynamic range compensator for compensating the eigenvector to substantially equalize a dynamic range of the first color component set with a dynamic range of the second color component set; and
   a bias compensator for compensating a bias of the first color component set to be equalized with a bias of the second color component set.

20. The apparatus of claim 19, wherein the first color space is a color space represented by a RGB color component set, the dynamic range compensator normalizes each of the elements of the eigenvector using a L1 norm, and the transformation function is substantially equal to the following matrix:

$$\begin{bmatrix} 0.646 & 0.688 & 0.666 \\ -1.0 & 0.212 & 0.788 \\ -0.322 & 1.0 & -0.678 \end{bmatrix}.$$

21. A color transformation apparatus transforming a color component set representing a color space to another color component set representing a different color space, the color apparatus comprising:
  tangible memory for storing a first color component set and a second color component set to correspond to each other; and
  a color transformer for transforming the first color component set read from the tangible memory to the second color component set, wherein the color transformer comprises:
    a dominant component acquirer for determining a first transformation matrix used for acquiring dominant components of the first color component set according to a predetermined transformation algorithm;
    a dynamic range compensator for compensating the first transformation matrix to substantially equalize a dynamic range of the first color component set with a dynamic range of the second color component set; and
    a central processor for calculating the second color component set using the compensated first transformation matrix.

22. The apparatus of claim 21, further comprising an inverse transformer for inverse-transforming the second color component set to the first color component set using an inverse matrix of the compensated first transformation matrix.

23. The apparatus of claim 22, wherein the dominant component acquirer determines the first transformation matrix based on a Karhunen-Loeve (KL) Transformation used for acquiring dominant components using an autocorrelation characteristic of the first color components.

24. The apparatus of claim 23, wherein the dominant component acquirer comprises:
  an autocorrelation matrix calculator for calculating an autocorrelation matrix of normalized values of elements of the first color component set;
  an eigenvector calculator for calculating an eigenvector by KL-transforming the autocorrelation matrix; and
  a bias compensator for compensating a bias of the first color component set to be equalized with a bias of the second color component set.

25. The apparatus of claim 24, wherein the first color space is a color space represented by a RGB color component set, a dynamic range compensator normalizes each of the elements of the eigenvector using a L1 norm, and the transformation function is substantially equal to the following matrix:

$$\begin{bmatrix} 0.646 & 0.688 & 0.666 \\ -1.0 & 0.212 & 0.788 \\ -0.322 & 1.0 & -0.678 \end{bmatrix}.$$

* * * * *